(12) United States Patent
Takamatsu et al.

(10) Patent No.: US 10,609,914 B2
(45) Date of Patent: Apr. 7, 2020

(54) GEAR MECHANISM FOR A FISHING REEL (71) Applicant: Shimano Inc., Sakai, Osaka (JP)

(72) Inventors: Takuji Takamatsu, Osaka (JP); Tetsuo Inoue, Osaka (JP); Kei Saito, Osaka (JP); Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 68 days.

(21) Appl. No.: 15/876,658

(22) Filed: Jan. 22, 2018

(65) Prior Publication Data

US 2018/0310540 A1  Nov. 1, 2018

(30) Foreign Application Priority Data

Apr. 26, 2017  (JP) .................................. 2017-086999

(51) Int. Cl.
  *A01K 89/01*  (2006.01)
  *A01K 89/015*  (2006.01)
  *F16H 55/22*  (2006.01)
  *F16H 55/17*  (2006.01)
  *F16H 55/08*  (2006.01)
  *F16H 1/14*  (2006.01)

(52) U.S. Cl.
  CPC .......... *A01K 89/0183* (2015.05); *F16H 1/145* (2013.01); *F16H 55/08* (2013.01); *F16H 55/17* (2013.01); *F16H 55/22* (2013.01)

(58) Field of Classification Search
  CPC ........ F16H 55/08; F16H 55/22; F16H 55/088; F16H 55/086; F16H 1/45; A01K 89/01902
  See application file for complete search history.

(56) References Cited

U.S. PATENT DOCUMENTS

| | | | | |
|---|---|---|---|---|
| 2,682,760 A | * | 7/1954 | Shenk | F16D 3/185 464/154 |
| 2,750,850 A | * | 6/1956 | Wildhaber | B23F 15/06 409/51 |
| 2,881,630 A | * | 4/1959 | Opocensky | F16H 27/08 235/139 R |
| 4,036,073 A | * | 7/1977 | Kitano | F16H 35/02 74/393 |
| 4,108,017 A | * | 8/1978 | Rouverol | F16H 55/08 74/462 |
| 4,651,588 A | * | 3/1987 | Rouverol | F16H 55/0806 74/462 |

(Continued)

FOREIGN PATENT DOCUMENTS

| | | | | |
|---|---|---|---|---|
| JP | 0822739 | * | 9/1996 | .............. B23F 21/00 |
| JP | 2007-259713 A | | 10/2007 | |

*Primary Examiner* — Emmanuel M Marcelo
(74) *Attorney, Agent, or Firm* — Global IP Counselors, LLP (57) ABSTRACT

A gear mechanism for a fishing reel includes first and second gears. The first gear has first gear teeth including a first driving side face, and a first reverse side face opposite the first driving side face. The second gear has second gear teeth including a second driven side face that meshes with a respective first driving side faces, and a second reverse side face that faces a respective first reverse side face, and opposite the second driven side faces. At least one of each of the first reverse side faces and each of the second reverse side faces includes an interference prevention portion to prevent interference with the other of the opposing first reverse side faces and second reverse side faces.

6 Claims, 9 Drawing Sheets

(56) References Cited

U.S. PATENT DOCUMENTS

| | | | | |
|---|---|---|---|---|
| 4,812,749 | A * | 3/1989 | Sato | F16H 55/02 |
| | | | | 235/144 ME |
| 6,682,456 | B2 * | 1/2004 | Allen | F16H 55/0886 |
| | | | | 475/344 |
| 9,267,594 | B2 * | 2/2016 | Benedict | B21K 1/30 |
| 2012/0097779 | A1 * | 4/2012 | Inoue | F16H 55/17 |
| | | | | 242/249 |
| 2017/0152926 | A1 * | 6/2017 | Ikeda | F16H 55/17 |

* cited by examiner

FIG. 9

GEAR MECHANISM FOR A FISHING REEL

CROSS-REFERENCE TO RELATED APPLICATIONS

This application claims priority to Japanese Patent Application No. 2017-086999, filed on Apr. 26, 2017. The entire disclosure of Japanese Patent Application No. 2017-086999 is hereby incorporated herein by reference.

BACKGROUND

Field of the Invention

The present invention relates to a gear mechanism for a fishing reel.

Background Art

A conventional fishing reel generally includes a rotation transmission mechanism for winding (reeling) a fishing line onto a spool in accordance with rotation of a handle. The rotation transmission mechanism can include a drive gear having face gear teeth that transmits the rotation of the handle to the rotor, and a pinion gear having helical teeth that mesh with the face gear teeth.

The face gear teeth comprise driving side faces that mesh with the helical teeth of the pinion gear when the drive gear is rotated in the rotational direction for winding the fishing line, and reverse side faces that are positioned on the opposite side of the driving side faces. Similarly, the helical teeth of the pinion gear comprise driven side faces that mesh with the driving side faces of the face gear teeth, and reverse side faces that are positioned on the opposite side of the driven side faces of the pinion gear (refer to Japanese Laid-Open Patent Publication No. 2007-259713).

In the spinning reel disclosed in Japanese Laid-Open Patent Publication No. 2007-259713, a relief portion is formed on the radial outer side end portion of the reverse side faces of this face gear teeth. By forming this relief portion, when the driving side faces of the face gear teeth start to mesh with the driven side faces of the pinion gear, the radial outer side end portion of the reverse side faces of the face gear teeth are prevented from contacting the reverse side faces of the pinion gear.

Meanwhile, the strength of a drive gear is generally higher than the strength of the pinion gear. Consequently, when power is transmitted from the drive gear to the pinion gear, it is possible to bend and deform the pinion gear.

More specifically, when the drive gear rotates in the rotational direction for winding the fishing line, if the strength of the pinion gear is lower than the strength of the drive gear, there is potential that the helical teeth of the pinion gear will bend when the drive gear and the pinion gear mesh with each other. When the helical teeth of the pinion gear are bent and the reverse side faces of the pinion gear are in contact with the reverse side faces of the drive gear, the meshing state between the drive gear and the pinion gear deteriorates, and the rotation performance and the rotation feeling is deteriorated. In addition, if the reverse side faces of the pinion gear and the reverse side faces of the drive gear come in contact, the gear teeth will wear and the strength of the gear teeth will be reduced.

SUMMARY

An object of the present invention is to prevent a reduction in the strength of the gears in a gear mechanism for a fishing reel by suppressing deterioration of the meshing state of the gears and by suppressing wear of the gears, even if a gear is bent.

A gear mechanism for a fishing reel according to one aspect of the present invention comprises a first gear and a second gear. The first gear comprises a plurality of first gear teeth, including first driving side faces that transmit power during rotation in the rotational direction for winding the fishing line, and first reverse side faces on the opposite sides of the first driving side faces. The second gear comprises a plurality of second gear teeth, including second driven side faces configured to mesh with the first driving side faces and to which the power of the first gear is transmitted, and second reverse side faces that faces the first reverse side faces, on the opposite sides of the second driven side faces. At least one of the first reverse side faces and the second reverse side faces comprise an interference prevention portion for preventing interference with the other of the opposing first reverse side faces and second reverse side faces.

In this gear mechanism for a fishing reel, when the driving side faces of the first gear and the driven side faces of the second gear mesh with each other, even if at least one of the first gear teeth and the second gear teeth is bent and the first reverse side faces of the first gear teeth and the second reverse side faces of the second gear teeth are about to contact each other, it is possible to suppress or prevent contact between the two using the interference prevention portion. As a result, it is possible to suppress deterioration in the meshing state of the gears, and to prevent a deterioration in the gears by suppressing the wear of the gears.

Preferably, the interference prevention portion has a notched portion formed by cutting out at bottom portion of at least one of the first reverse side faces and the second reverse side faces. In this embodiment, it is possible to suppress or prevent contact between the first reverse side faces of the first gear teeth and the second reverse side faces of the second gear teeth, by cutting out a portion of the tooth surface where the reverse side faces of the first gear teeth and the reverse side faces of the second gear teeth come in contact, which occurs when at least one of the first gear teeth and the second gear teeth is bent.

In one embodiment, the first gear teeth can be higher in strength than the second gear teeth, and the interference prevention portion can be formed in at least one of the tooth bottom of the first reverse side faces of the first gear and the tooth top of the second reverse side faces of the second gear. In this embodiment, it is possible to effectively suppress or prevent contact between the first reverse side faces and the second reverse side faces, by providing an interference prevention portion on the tooth surface of a portion where it is likely that the first reverse side faces and the second reverse side faces would come in contact, when the first gear and the second gear mesh with each other and the second gear, having a lower strength, is bent.

In one embodiment, the first gear teeth can be lower in strength than the second gear teeth, and the interference prevention portion can be formed in at least one of the tooth top of the first reverse side faces of the first gear and the tooth bottom of the second reverse side faces of the second gear. In this embodiment, it is possible to effectively suppress or prevent contact between the first reverse side faces and the second reverse side faces, by providing an interference prevention portion on the tooth surface of a portion where it is likely that the first reverse side faces and the second reverse side faces would come in contact, when the first gear and the second gear mesh with each other and the first gear, having a lower strength, is bent.

The first gear can be a drive gear and the second gear can be a pinion gear that meshes with the drive gear. In this embodiment, since deterioration in the meshing state between the drive gear and the pinion gear can be suppressed by the interference prevention portion, it is possible to suppress deterioration in the rotation feeling.

According to the present invention, it is possible to suppress deterioration of the meshing state of the gears in a gear mechanism for a fishing reel, and to prevent a reduction in the strength of the gears by suppressing wear of the gears, even if a gear is bent.

DETAILED DESCRIPTION OF THE EMBODIMENTS

First Embodiment

Figure 1:
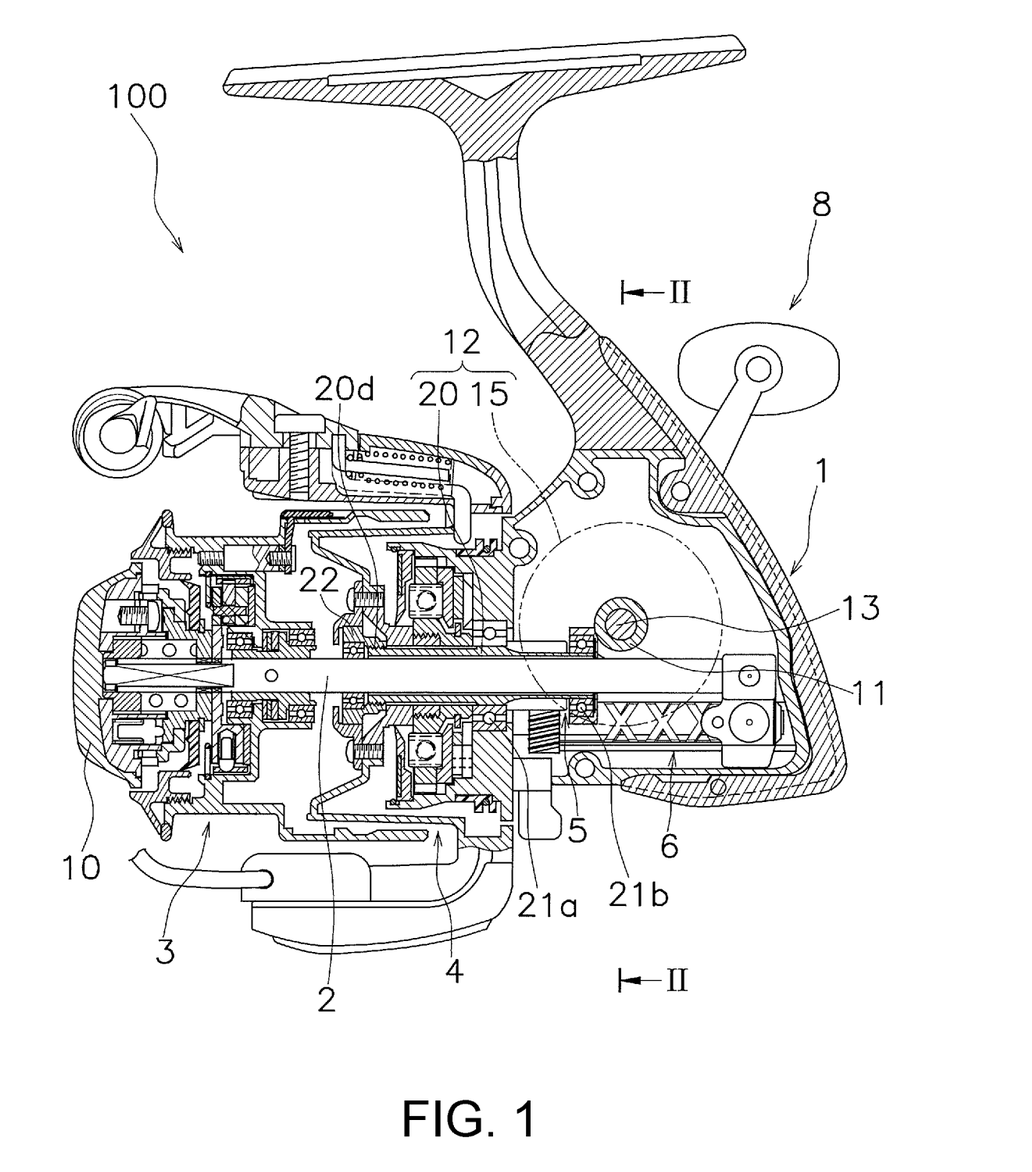
FIG. 1 is a longitudinal cross-sectional view of a spinning reel employing one embodiment of the present invention.

FIG. 1 is a longitudinal cross-sectional view of a spinning reel (one example of a fishing reel) 100 employing one embodiment of the present invention. The spinning reel 100 comprises a reel body 1, a spool shaft 2, a spool 3, a rotor 4, and a rotor drive mechanism 5. Meanwhile, in the following descriptions, regarding the terms front and rear, when fishing, the direction in which the fishing line is unreeled (cast) is referred to as the front, and the opposite direction is referred to as the rear. Specifically, the left side in FIG. 1 is defined as front, and the right side is defined as rear.

The reel body 1 comprises an internal space, and a rotor drive mechanism 5, an oscillating mechanism 6 for uniformly winding (reeling) a fishing line onto the spool 3, and the like are housed in the internal space. A handle 8 is mounted on the side of the reel body 1 so as to be rotatable with respect to the reel body 1.

The spool shaft 2 is provided to the reel body 1, extending in the front-rear direction. The spool shaft 2 is supported on the reel body 1 so as to be movable in the front-rear direction.

The spool 3 is a member on the outer perimeter of which a fishing line is wound. The spool 3 is fixed to the spool shaft 2 by a knob member 10 that screws onto the tip of the spool shaft 2. The spool 3 reciprocates relative to the reel body 1 in the front-rear direction together with the spool shaft 2, in accordance with the rotation of the handle 8.

The rotor 4 is a member for winding the fishing line onto the spool 3. The rotor 4 rotates about the center axis of the spool 3 in accordance with the rotation of the handle 8.

The rotor drive mechanism 5 is a mechanism for transmitting the rotation of the handle 8 to the rotor 4, and the rotor 4 is rotated in conjunction with the rotation of the handle 8. The rotor drive mechanism 5 comprises a drive shaft 11 and a gear mechanism 12.

Figure 2:
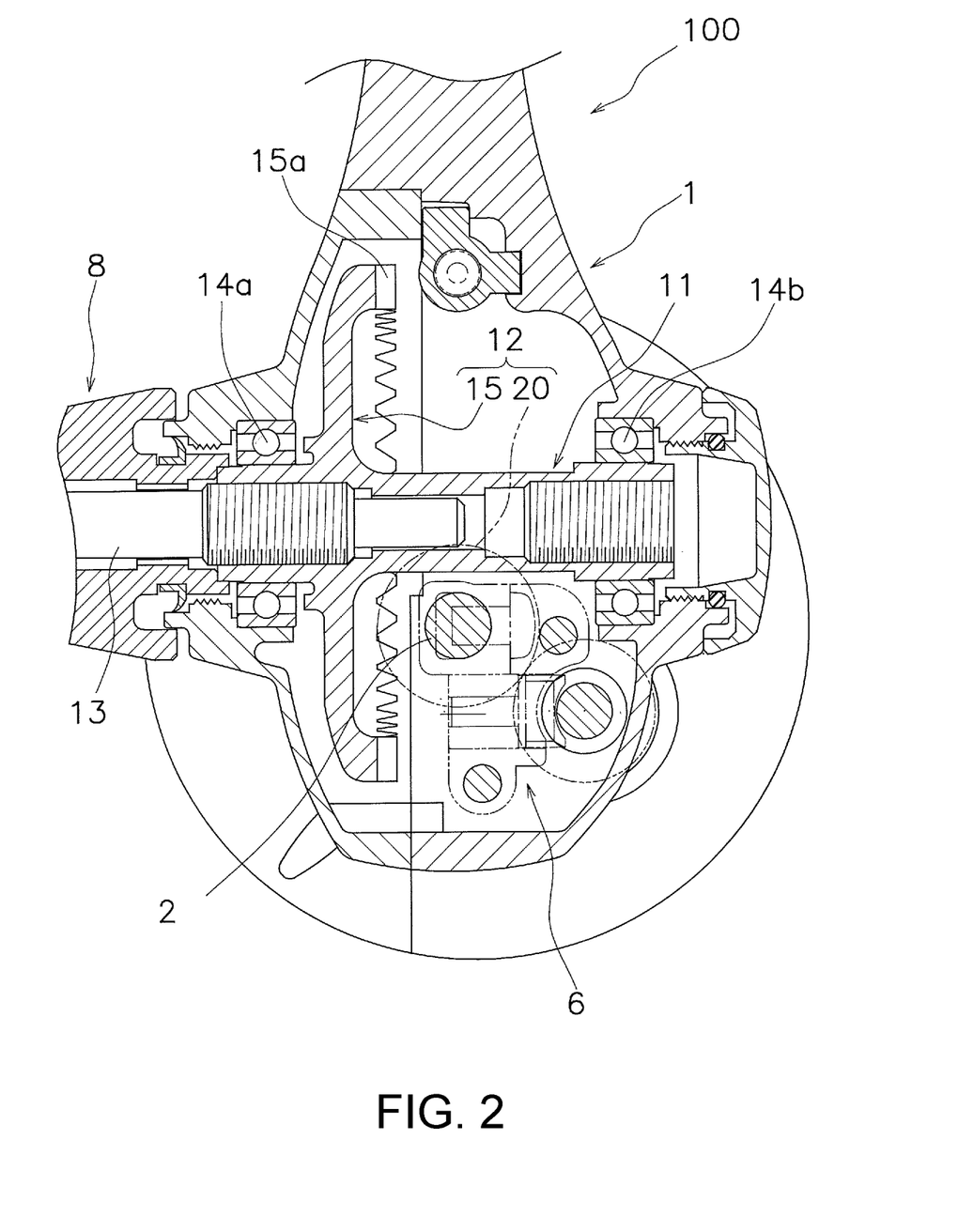
FIG. 2 is a cross-sectional view along the II-II line of FIG. 1.

As shown in FIG. 2, the drive shaft 11 is coupled to the handle shaft 13, to which the handle 8 is coupled, so as to be integrally rotatable, and is rotated in conjunction with the rotation of the handle 8. The drive shaft 11 is rotatably supported in the reel body 1 by the axle bearings 14a, 14b, which are mounted on the reel body 1.

Figure 3:
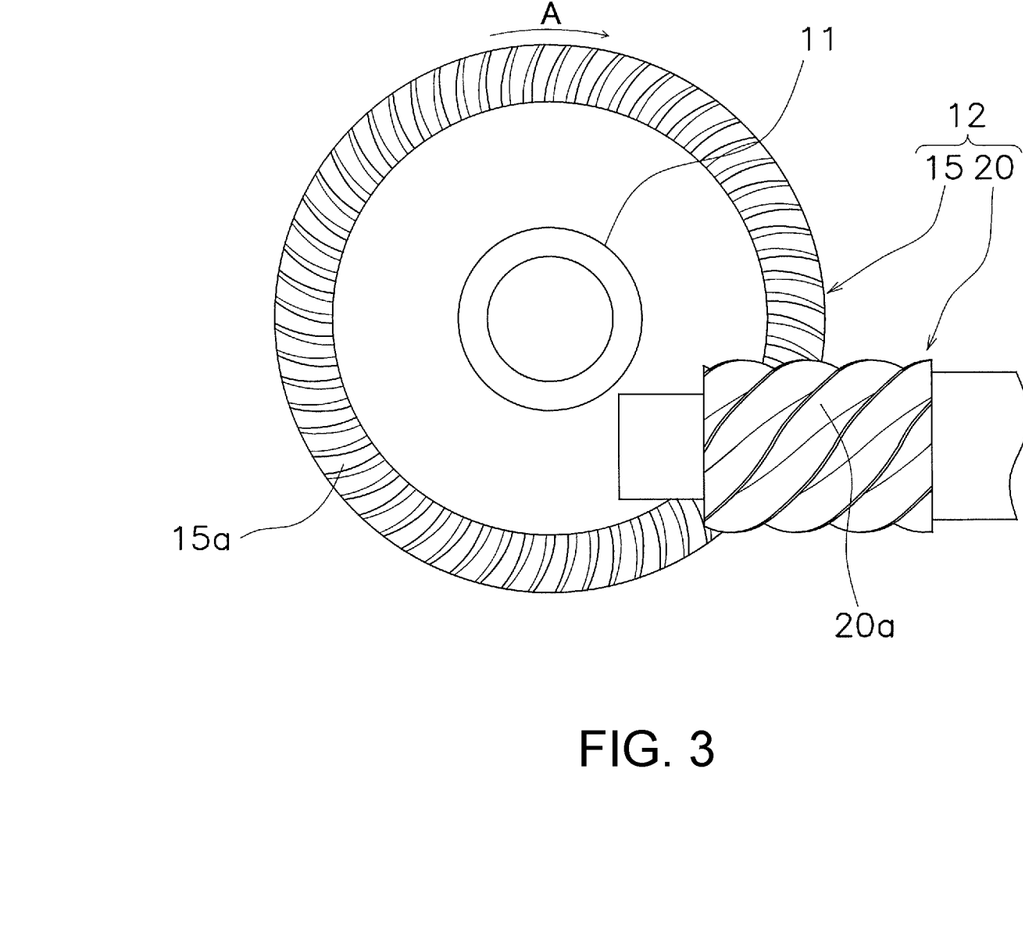
FIG. 3 is a plan view of the gear mechanism.

As shown in FIG. 3, the gear mechanism 12 comprises a drive gear 15 and a pinion gear 20 that meshes with the drive gear 15. In the present embodiment, the drive gear 15 is one example of the first gear, and the pinion gear 20 is one example of the second gear.

The drive gear 15 is a face gear in the present embodiment, and is formed by, for example, forging an aluminum alloy. Furthermore, the drive gear 15 is integrally formed with the drive shaft 11. The drive gear 15 and the drive shaft 11 may be formed as separate bodies.

As shown in FIG. 3, the drive gear 15 comprises a plurality of first gear teeth 15a formed at a predetermined pitch on the outer perimeter surface thereof. The plurality of first gear teeth 15a are formed of helical teeth having a predetermined helical angle.

Figure 4:
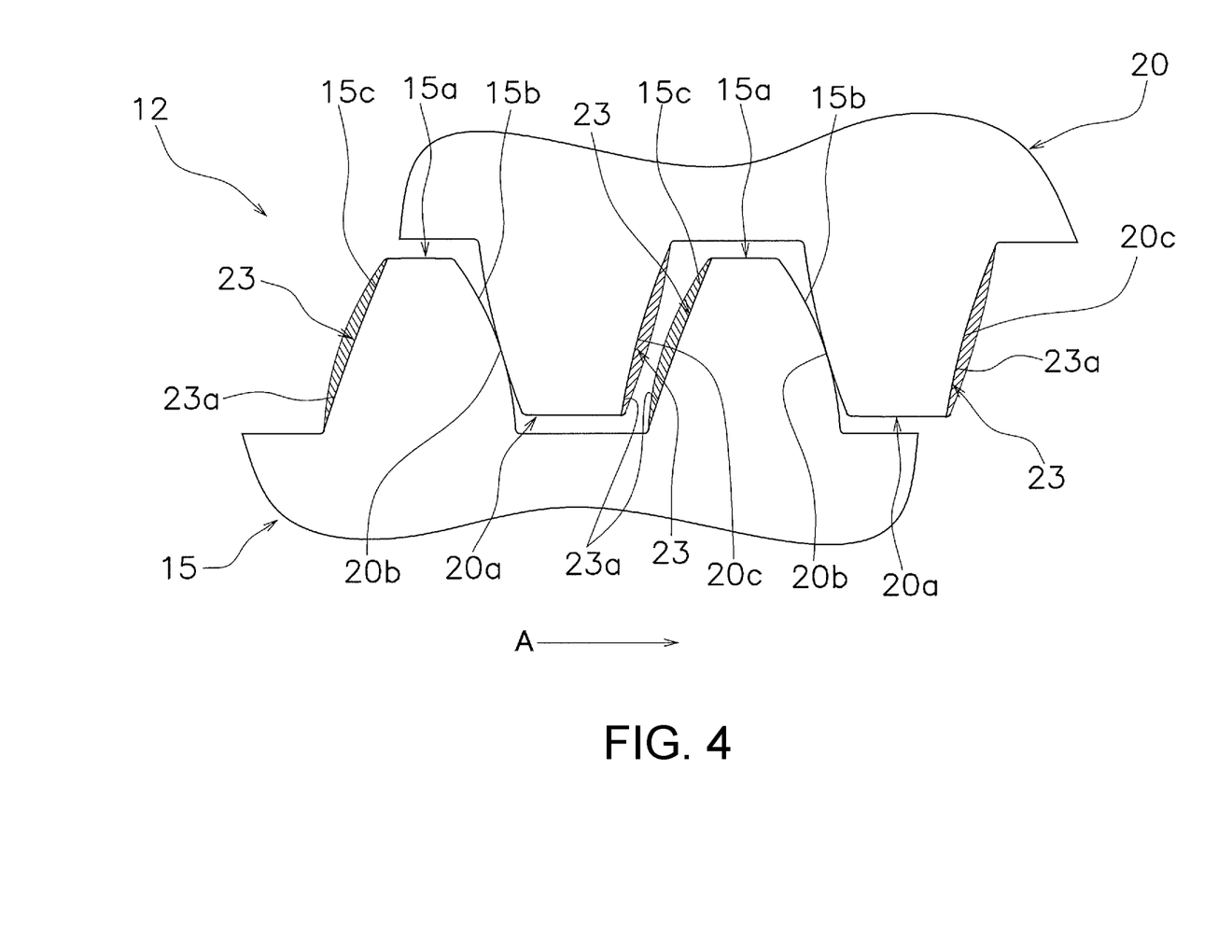
FIG. 4 is a schematic view illustrating the meshing state between the first gear teeth and the second gear teeth.

As shown in FIG. 4, each of the plurality of first gear teeth 15a comprises a first driving side face (leading face) 15b and a first reverse side face (trailing face) 15c. FIG. 4 shows an exploded schematic view of the meshing state between the drive gear 15 and the pinion gear 20 when the drive gear 15 is rotated in the rotational direction A for winding the fishing line, in order to describe the details of the gear mechanism 12 in an easy-to-understand manner.

The first driving side face 15b meshes with the pinion gear 20 when the drive gear 15 is rotated in the rotational direction A for winding the fishing line; the power is thereby transmitted to the pinion gear 20, and the pinion gear 20 is rotated.

The first reverse side face 15c is a tooth surface positioned on the opposite side to the first driving side face 15b. When the drive gear 15 is rotated in the reverse direction for casting the fishing line, the first reverse side face 15c meshes with the pinion gear 20, and the power is transmitted to the pinion gear 20.

The pinion gear 20 is disposed such that the center axis thereof crosses the drive shaft 11, around the axis of the spool shaft 2. The pinion gear 20 is rotatably supported on the reel body 1 by axle bearings 21a, 21b, which are mounted on the reel body 1 (refer to FIG. 1). As shown in FIG. 3, the pinion gear 20 comprises a plurality of second gear teeth 20a that mesh with the first gear teeth 15a. The plurality of second gear teeth 20a are formed of helical teeth having a predetermined helical angle, corresponding to the plurality of the first gear teeth 15a.

As shown schematically in FIG. 4, each of the plurality of second gear teeth 20a comprises a second driven side face (led face) 20b and a second reverse side face (trailing face) 20c. The second driven side face 20b meshes with the first driving side face 15b of the first gear teeth 15a, when the drive gear 15 is rotated in the rotational direction A for winding the fishing line.

The second reverse side face 20c is a tooth surface positioned on the opposite side of the second driven side face 20b. The second reverse side face 20c faces the first reverse side face 15c, when the second driven side face 20b meshes with the first driving side face 15b.

A male threaded portion 20d is formed on the outer peripheral surface of the front end of the pinion gear 20 (refer to FIG. 1). A nut 22 for fixing the rotor 4 is screwed onto this male threaded portion 20d, and the rotor 4 is fixed to the pinion gear 20 so as to be integrally rotatable therewith. According to such a configuration, power is transmitted from the drive gear 15 to the pinion gear 20, which meshes with the drive gear 15, in accordance with the rotation of the handle 8, and the rotor 4 is rotated together with the pinion gear 20.

Figure 5:
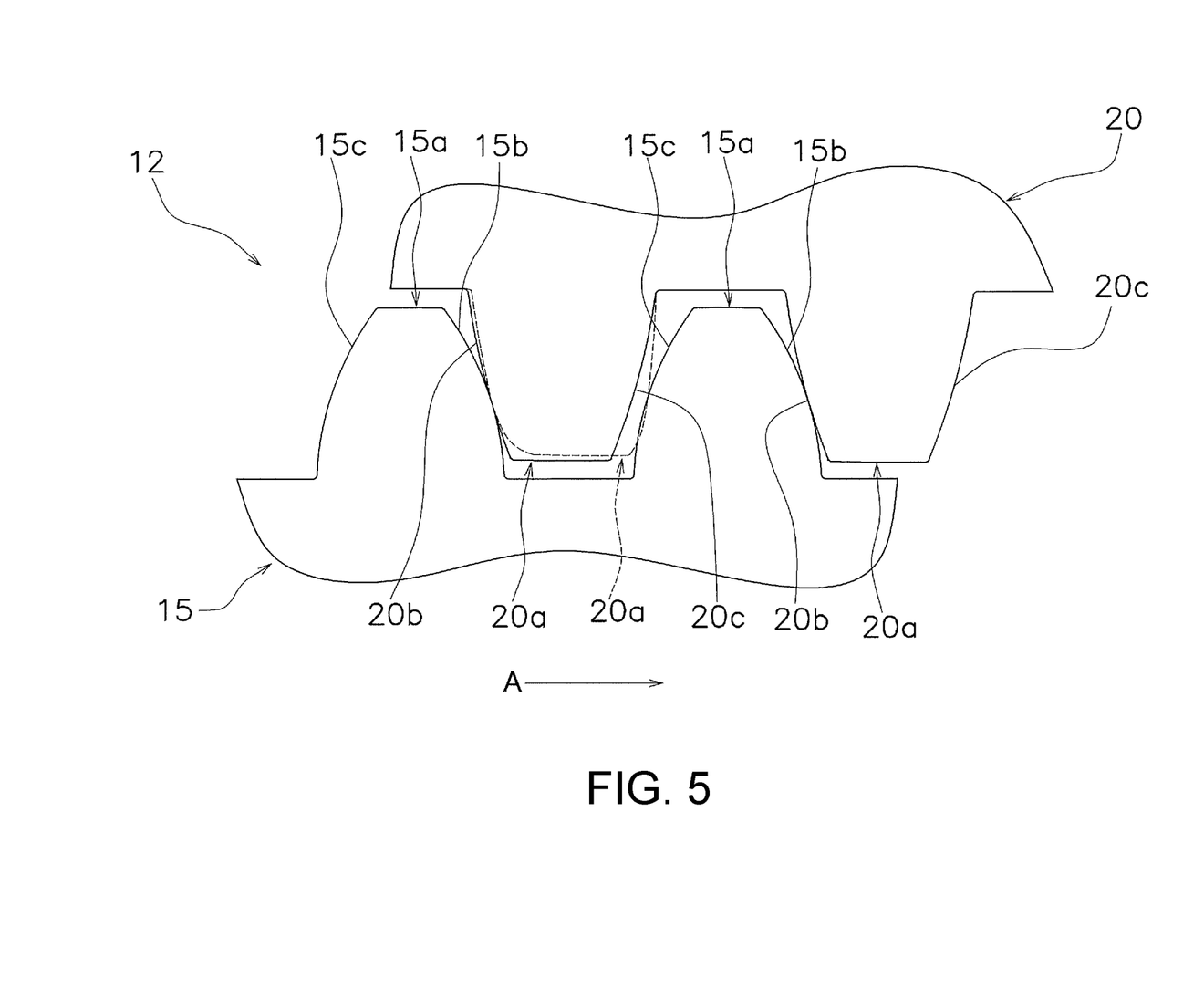
FIG. 5 is a schematic view illustrating the state when the first gear teeth are bent.

Here, the problem of the present invention will be described with reference to FIG. 5. The strength of the drive gear 15 is generally higher than the strength of the pinion gear 20. In the present embodiment as well, the strength of the drive gear 15 is higher than the strength of the pinion gear 20. More specifically, the strength of the plurality of first gear teeth 15a is higher than the strength of the plurality of second gear teeth 20a. Accordingly, when the first driving side faces 15b of the plurality of first gear teeth 15a mesh with the second driven side faces 20b of the plurality of second gear teeth 20a, the second gear teeth 20a that mesh with the first driving side faces 15b may receive a load (rotational power), and the second gear 20a may be bent and deformed toward the rotational direction A side, as shown by the broken lines in FIG. 5. In FIG. 5, the configuration of the interference prevention portion 23, described later, is not illustrated, in order to explain the bent state of the second gear teeth 20a in an easy-to-understand manner.

When the second gear teeth 20a are bent and deformed toward the rotational direction A side, depending on the shape of the first gear teeth 15a and the second gear teeth 20a, the second reverse side face 20c of the second gear teeth 20a contact the first reverse side face 15c of the first gear teeth 15a. When the first reverse side face 15c and the second reverse side face 20c contact, the meshing state between the drive gear 15 and the pinion gear 20 deteriorates, and the rotation performance and the rotation feeling is reduced. Furthermore, the gear teeth are worn, and the strength of the gear teeth is also reduced.

Therefore, as shown in FIG. 4, at least one of the first reverse side faces 15c and the second reverse side faces 20c comprise an interference prevention portion 23 for preventing interference with the other of the opposing first reverse side faces 15c and second reverse side faces 20c.

The interference prevention portion 23 has a notched portion 23a formed by cutting out at least a portion of at least one of the first reverse side face 15c and the second reverse side face 20c. In the present embodiment, a notched portion 23a is formed in each of the plurality of first gear teeth 15a and in each of the plurality of second gear teeth 20a. The notched portion 23a is formed by cutting out the hatched portion shown in FIG. 4 on the second reverse side face 20c and the first reverse side face 15c, which opposes the second reverse side face 20c. In FIG. 4, the notched portion 23a is formed by cutting out entirely from the tooth top to the tooth bottom of the tooth surface of the second reverse side face 20c and the second reverse side face 20c; however, FIG. 4 shows an exploded schematic view of the meshing state between the drive gear 15 and the pinion gear 20, and the position, size, shape, etc. of the notched portion 23a are appropriately adjusted according to the shapes, and the like, of the drive gear 15 and the pinion gear 20.

By providing the interference prevention portion 23, it is possible to prevent mutual interference caused by the contact between the first reverse side face 15c of the first gear teeth 15a and the second reverse side face 20c of the second gear teeth 20a, even when the second gear teeth 20a of the pinion gear 20 is bent. Accordingly, since deterioration in the meshing state between the drive gear 15 and the pinion gear 20 can be suppressed, it is possible to suppress deterioration in the rotation performance and the rotation feeling. In addition, since it is possible to suppress wear of the gear teeth caused by the contact between the first reverse side face 15c of the first gear teeth 15a and the second reverse side face 20c of the second gear teeth 20a, it is also possible to suppress a reduction in the strength of the gear teeth.

Second Embodiment

Figure 6:
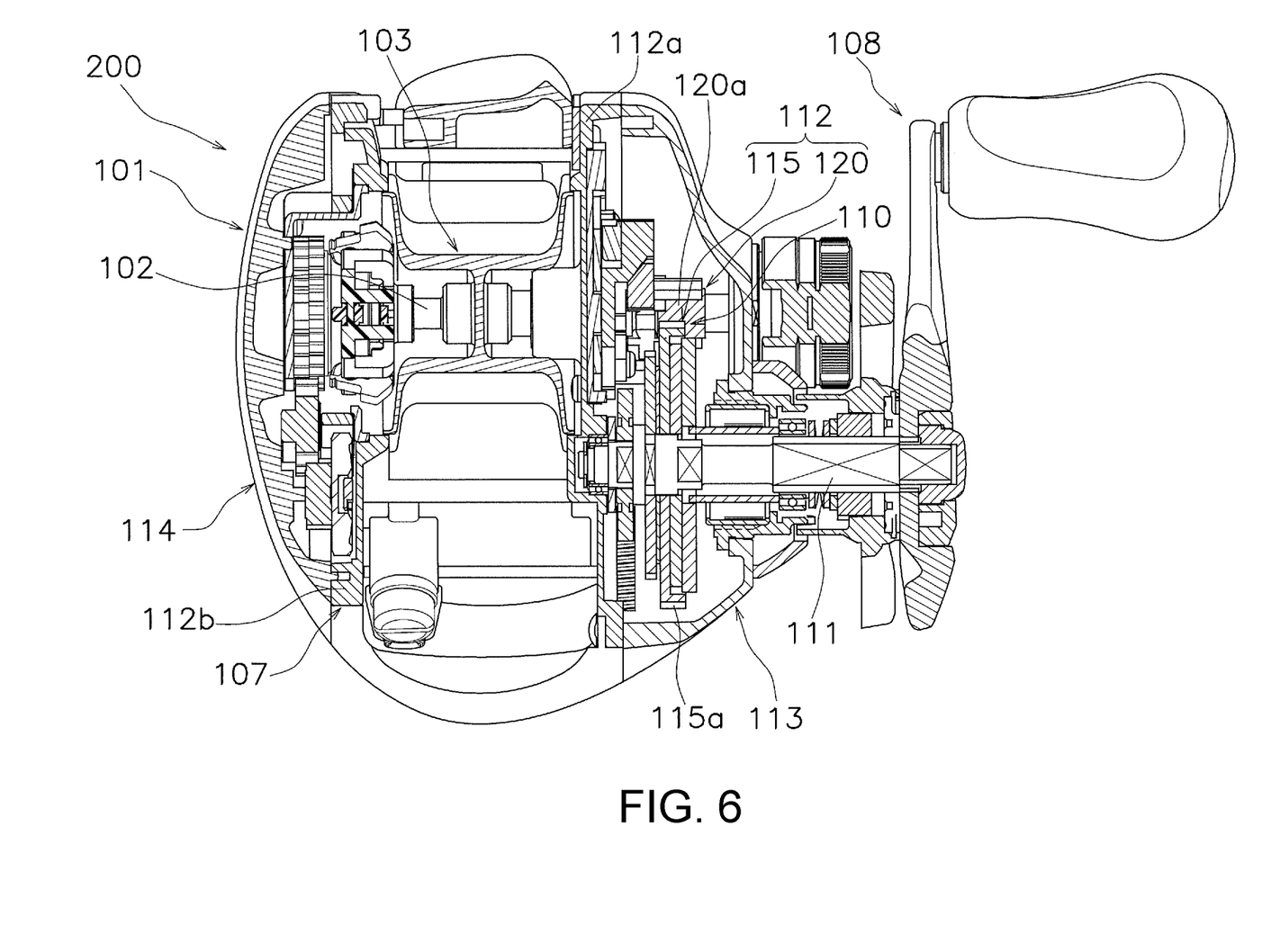
FIG. 6 is a cross-sectional view of a dual-bearing reel employing one embodiment of the present invention.

FIG. 6 is a cross-sectional view of a dual-bearing reel (one example of a fishing reel) 200 employing one embodiment of the present invention. The dual-bearing reel 200 comprises a reel body 101, a spool 103, a handle 108, and a rotation transmission mechanism 110.

The reel body 101 comprises a frame 107, and a first side cover 113 and a second side cover 114 mounted so as to cover both sides of the frame 107. The frame 107 comprises a first side plate 112a, a second side plate 112b that is formed at a predetermined interval from the first side plate 112a, and a plurality of connecting portions, which are not shown, that connect the first side plate 112a and the second side plate 112b.

The spool 103 is rotatably disposed between the first side plate 112a and the second side plate 112b. The spool 103 is fixed to a spool shaft 102 that extends through the center of the spool 103, and is integrally rotated with the spool shaft 102. The spool shaft 102 is rotatably supported on the reel body 101 via axle bearings, which are not shown, disposed in the reel body 101.

The handle 108 is rotatably mounted on the first side cover 113 side of the reel body 101. The spool 103 is rotated via the rotation transmission mechanism 110 by rotating the handle 108.

The rotation transmission mechanism 110 is disposed inside the first side cover 113. The rotation transmission mechanism 110 comprises a drive shaft 111 and a gear mechanism 112. The drive shaft 111 is non-rotatably connected to the handle 108.

The gear mechanism 112 comprises a drive gear 115 and a pinion gear 120 that meshes with the drive gear 115. The drive gear 115 is mounted on the drive shaft 111, and is rotated in accordance with the rotation of the drive shaft 111.

The drive gear 115 is a cylindrical gear, and comprises a plurality of first gear teeth 115a formed at a predetermined pitch on the outer perimeter surface thereof. The plurality of first gear teeth 115a are formed of helical teeth having a predetermined helix angle.

Figure 7:
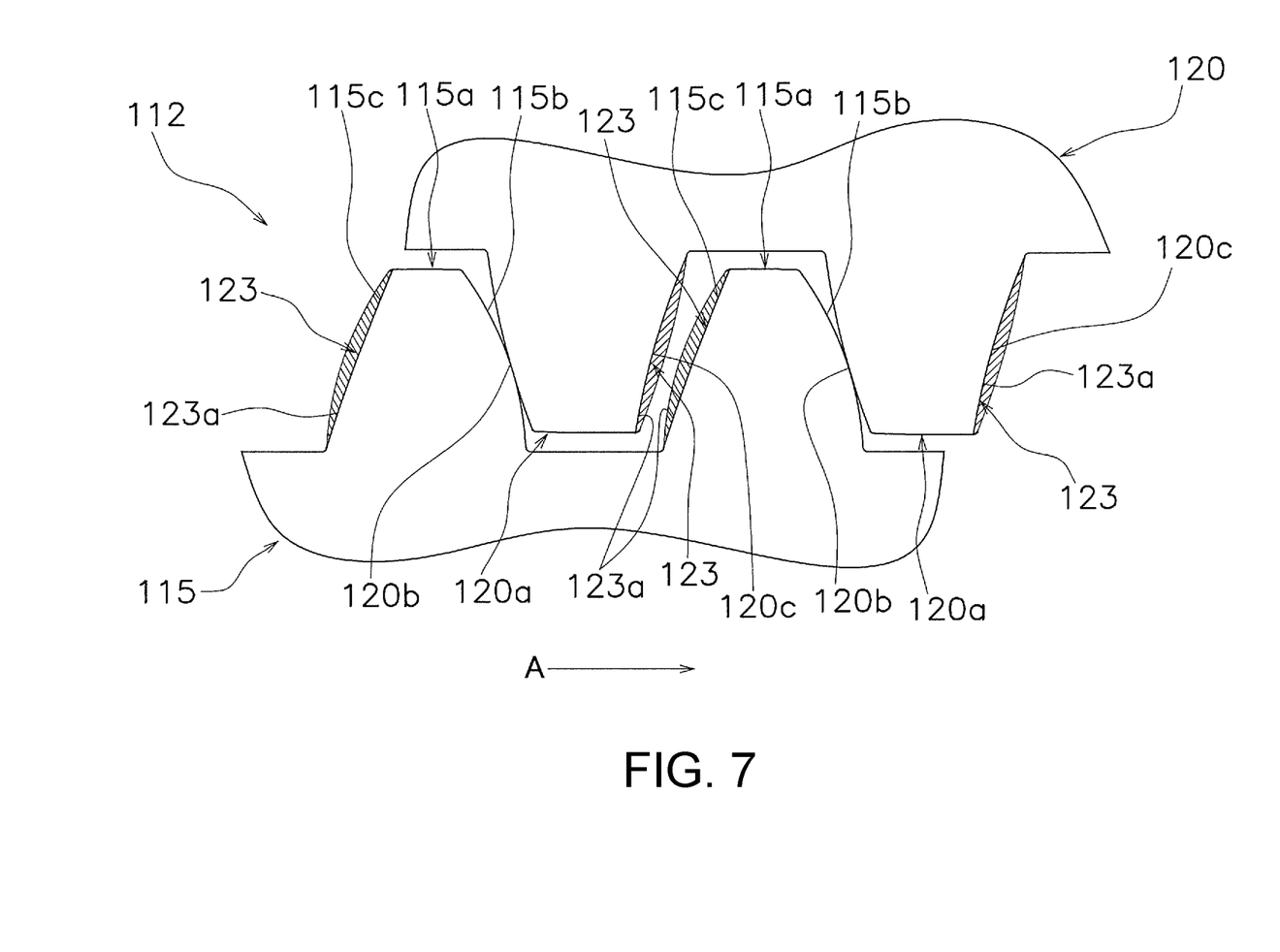
FIG. 7 is a view corresponding to FIG. 4 according to another embodiment.

As schematically shown exploded in FIG. 7, each of the plurality of first gear teeth 115a comprises a first driving side face 115b and a first reverse side face 115c, in the same manner as the first embodiment. The first driving side face 115b meshes with the pinion gear 120 when the drive gear 115 is rotated in the rotational direction A for winding the fishing line; the power is thereby transmitted to the pinion gear 120, and the pinion gear 120 is rotated.

The pinion gear 120 is disposed in the reel body 101 parallel to the drive shaft 111. The pinion gear 120 comprises a plurality of second gear teeth 120a that mesh with the plurality of first gear teeth 115a. The plurality of second gear teeth 120a are formed of helical teeth having the same predetermined helical angle as the plurality of first gear teeth 115a.

Each of the plurality of second gear teeth 120a comprises a second driven side face 120b and a second reverse side face 120c, in the same manner as the first embodiment. The second driven side face 120b meshes with the first driving side face 115b of the first gear teeth 115a, when the drive gear 115 is rotated in the rotational direction A for winding the fishing line.

The second reverse side face 120c is a tooth surface positioned on the opposite side of the second driven side face 120b, and faces the first reverse side face 115c, when the second driven side face 120b meshes with the first driving side face 115b.

In the second embodiment as well, the strength of the plurality of first gear teeth 115a is higher than the strength of the plurality of second gear teeth 120a. The gear mechanism 112 includes an interference prevention portion 123 having a notched portion 123a, in the same manner as the first embodiment. Since the configuration of the interference prevention portion 123 is the same as in the first embodiment, the description thereof is omitted. By providing the interference prevention portion 123, the same effect as the first embodiment can be obtained.

Other Embodiments

One embodiment of the present invention was described above, but the present invention is not limited to the above-described embodiment, and various modifications can be made without departing from the scope of the invention. Especially, the various embodiments and modified examples described in the present Specification can be freely combined according to necessity.

Figure 8:
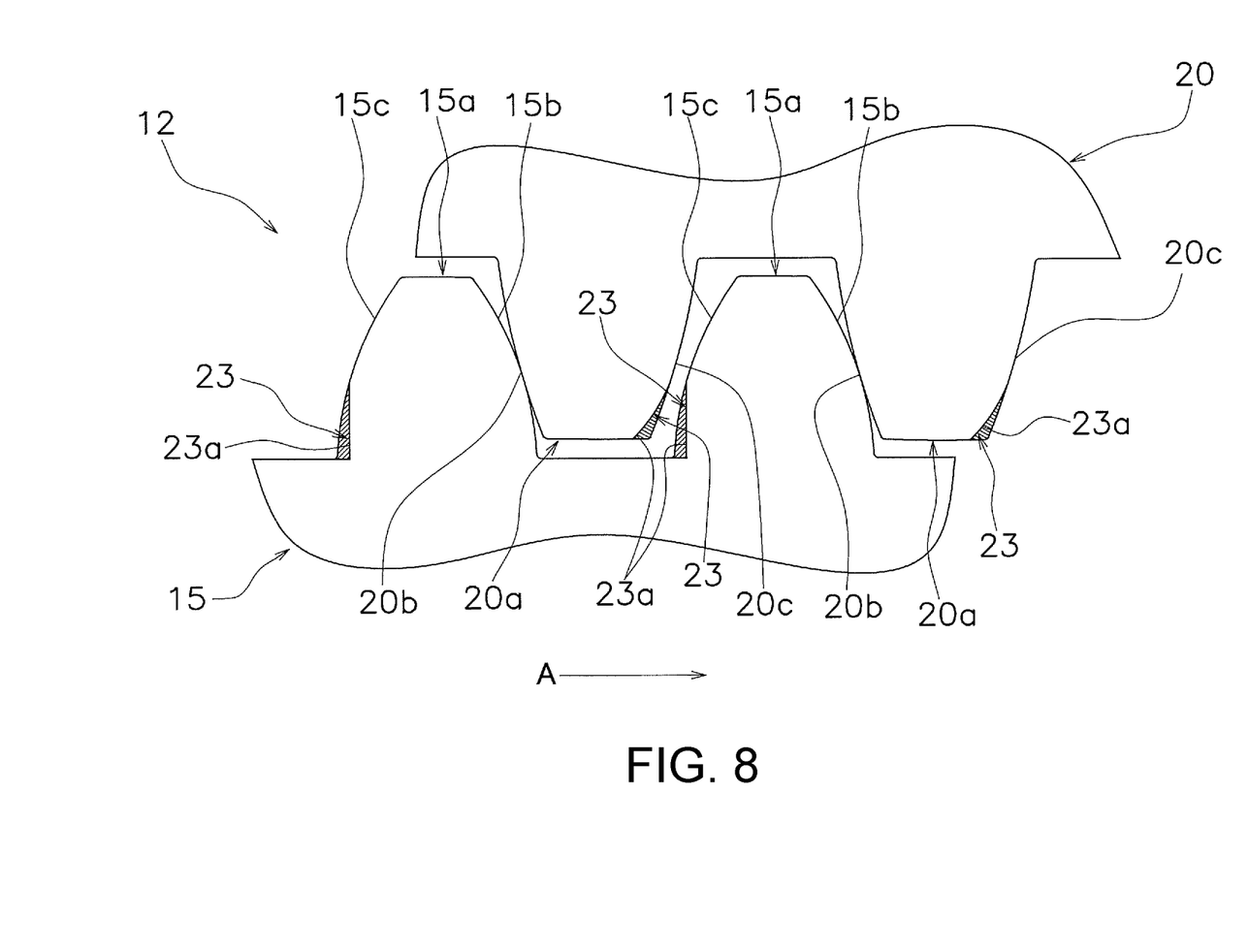
FIG. 8 is a view corresponding to FIG. 4 according to another embodiment.

In the first embodiment, an interference prevention portion 23 is disposed on each of the plurality of first gear teeth 15a and on each of the plurality of second gear teeth 20a; however, an interference prevention portion 23 may be disposed only one of the first reverse side face 15c and second reverse side face 20c. In this embodiment, as schematically shown exploded in FIG. 8, the interference prevention portion 23 may be disposed on at least one of the tooth bottom of the first reverse side face 15c and the tooth top of the second reverse side face 20c only. That is, the interference prevention portion 23 may be disposed within a range in which the first reverse side face 15c and the second reverse side face 20c are likely to interfere. Specifically, at least one of the tooth bottom of the first reverse side face 15c and the tooth top of the second reverse side face 20c, which faces the first reverse side face 15c, has a notched portion 23a formed by cutting out the hatched portion shown in FIG. 8. Furthermore, the position and the shape of the interference prevention portion 23 are not limited to the embodiments described above; any configuration that can prevent an interference between the first reverse side face 15c and second reverse side face 20c may be employed, and the position and the shape of the interference prevention portion 23 may be appropriately changed according to the shape of the gear teeth, or the like. The above-described configuration may be applied to the second embodiment.

Figure 9:
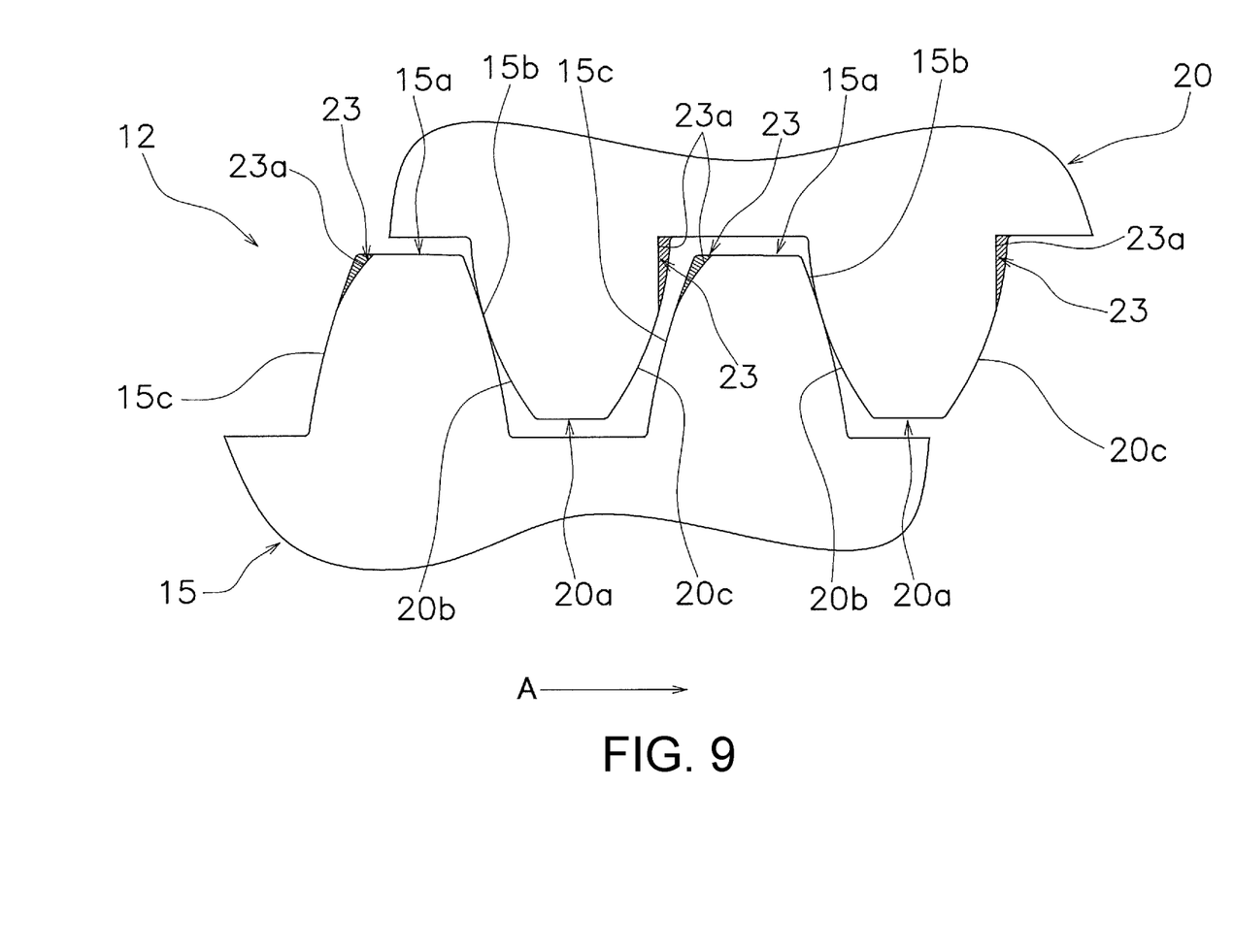
FIG. 9 is a view corresponding to FIG. 4 according to another embodiment.

In the first embodiment, an example was described in which the strength of the drive gear 15 is set higher than the strength of the pinion gear 20; however, the strength of the pinion gear 20 may be higher than the drive gear 15. In this embodiment as well, it is possible to prevent interference between the first reverse side face 15c and the second reverse side face 20c by the interference prevention portion 23 disposed on at least one of the first reverse side face 15c and the second reverse side face 20c, even when the first gear teeth 15a is bent and deformed inward toward the opposite side of the rotational direction A side (direction in which the first reverse side face 15c approaches the second reverse side face 20c), when the first driving side faces 15b of the first gear teeth 15a mesh with the second driven side faces 20b of the plurality of second gear teeth 20a. At this time, as schematically shown exploded in FIG. 9, the interference prevention portion 23 may be disposed on at least one of the tooth tip of the first reverse side face 15c and the tooth root of the second reverse side face 20c. The above-described configuration may be applied to the second embodiment.

In the embodiments described above, a spinning reel 100 and a dual-bearing reel 200 were shown as examples of a fishing reel; however, the present invention may be applied to other fishing reels.

In the embodiments described above, drive gears 15, 115 and pinion gears 20, 120 were shown as examples of a first gear and a second gear; however, the present invention may be applied to other gears that are used in a fishing reel.

In the second embodiment, a cylindrical gear having helical teeth was used as an example to describe the present invention; however, the present invention is not limited thereto, and the cylindrical gear may have double-helical teeth or straight teeth.

What is claimed is:

1. A gear mechanism for a fishing reel, comprising:
   a first gear having a plurality of first gear teeth, each of the plurality of first gear teeth including a first driving side face configured to transmit power during rotation in a rotational direction for winding a fishing line, and a first reverse side face opposite the first driving side face; and
   a second gear having a plurality of second gear teeth, each of the plurality of second gear teeth including a second driven side face configured to mesh with the first driving side face and to which the power of the first gear is transmitted, and a second reverse side face that faces the first reverse side face, and being opposite the second driven side face, the first gear teeth being higher in strength than the second gear teeth,
   at least one of the first reverse side face and the second reverse side face comprises an interference prevention portion configured to prevent interference with the other of the opposing the first reverse side face and the second reverse side face, and
   the interference prevention portion is formed in at least one of a tooth bottom of the first reverse side face of the first gear and a tooth top of the second reverse side face of the second gear.

2. The gear mechanism for a fishing reel according to claim 1, wherein
   the interference prevention portion has a notched portion formed by cutting out at least one of the first reverse side face and the second reverse side face.

3. The gear mechanism for a fishing reel according to claim 1, wherein
   the first gear is a drive gear, and
   the second gear is a pinion gear configured to mesh with the drive gear.

4. A gear mechanism for a fishing reel, comprising:
   a first gear having a plurality of first gear teeth, each of the plurality of first gear teeth including a first driving side face configured to transmit power during rotation in a rotational direction for winding a fishing line, and a first reverse side face opposite the first driving side face; and
   a second gear having a plurality of second gear teeth, each of the plurality of second gear teeth including a second driven side face configured to mesh with the first driving side face and to which the power of the first gear is transmitted, and a second reverse side face that faces the first reverse side face, and being opposite the second driven side face, the first gear teeth are lower in strength than the second gear teeth, at least one of the first reverse side face and the second reverse side face comprises an interference prevention portion configured to prevent interference with the other of the opposing the first reverse side face and the second reverse side face, and the interference prevention portion is formed in at least one of a tooth tip of the first reverse side faces of the first gear and a tooth root of the second reverse side faces of the second gear.

5. The gear mechanism for a fishing reel according to claim 4, wherein the interference prevention portion has a notched portion formed by cutting out at least one of the first reverse side face and the second reverse side face.

6. The gear mechanism for a fishing reel according to claim 4, wherein the first gear is a drive gear, and the second gear is a pinion gear configured to mesh with the drive gear.

* * * * *